US009404598B2

(12) United States Patent
Girouard

(10) Patent No.: US 9,404,598 B2
(45) Date of Patent: Aug. 2, 2016

(54) VALVE WITH TEMPERATURE ACTIVATED TRIGGER HAVING NOVEL MATERIAL CONFIGURATION

(71) Applicant: EMCARA GAS DEVELOPMENT INC., Guelph (CA)

(72) Inventor: Erick Girouard, Guelph (CA)

(73) Assignee: EMCARA GAS DEVELOPMENT INC., Guelph (CA)

( * ) Notice: Subject to any disclaimer, the term of this patent is extended or adjusted under 35 U.S.C. 154(b) by 0 days.

(21) Appl. No.: 14/815,087

(22) Filed: Jul. 31, 2015

(65) Prior Publication Data

US 2016/0131274 A1    May 12, 2016

Related U.S. Application Data

(63) Continuation of application No. 13/875,147, filed on May 1, 2013, now Pat. No. 9,097,358.

(51) Int. Cl.
*F16K 31/00* (2006.01)
*F16K 17/38* (2006.01)

(52) U.S. Cl.
CPC ............... *F16K 31/002* (2013.01); *F16K 17/38* (2013.01)

(58) Field of Classification Search
CPC ..... F16K 17/38; F16K 31/002; F16K 31/025; Y10T 137/7737
USPC ....................... 251/11, 66; 137/79; 169/59, 60
See application file for complete search history.

(56) References Cited

U.S. PATENT DOCUMENTS

| 5,213,128 | A | 5/1993 | Baird .............................. 137/73 |
| 5,495,865 | A | 3/1996 | Wass .............................. 137/72 |
| 5,788,212 | A | 8/1998 | Hackman et al. ............... 251/11 |
| 6,269,830 | B1 | 8/2001 | Ingle .............................. 137/79 |
| 8,820,069 | B2 | 9/2014 | Makinson et al. .............. 60/527 |
| 2012/0199764 | A1 | 8/2012 | Girouard ........................ 251/11 |

FOREIGN PATENT DOCUMENTS

| DE | 2353966 | 4/1975 |
| DE | 102006053147 | 5/2007 |
| WO | WO 93/23693 | 11/1993 |
| WO | WO 2010/132997 | 11/2010 |

OTHER PUBLICATIONS

International Search Report in PCT/CA2014/000393 dated Jul. 21, 2014.

*Primary Examiner* — Marina Tietjen
(74) *Attorney, Agent, or Firm* — Norton Rose Fulbright US LLP

(57) ABSTRACT

A temperature activated valve is provided comprising a trigger for effecting actuation of the valve. The trigger includes a temperature responsive trigger portion including a plurality of constituent trigger segments connected to one another in series. The constituent trigger segments include a plurality of temperature responsive trigger segments. Each one of the temperature responsive trigger segments, independently, includes a composite material, the composite material including: (a) a shape changing material-comprising component configured to assume a change in shape in response to receiving of heat energy by the temperature responsive trigger segment, and (b) a relatively inelastic material-comprising component having a modulus of elasticity that is greater than the modulus of elasticity of the shape changing material-comprising component.

15 Claims, 10 Drawing Sheets

VALVE WITH TEMPERATURE ACTIVATED TRIGGER HAVING NOVEL MATERIAL CONFIGURATION

CROSS REFERENCE TO RELATED APPLICATIONS

This application is a continuation of U.S. patent application Ser. No. 13/875,147 filed May 1, 2013, the entire contents of which are incorporated by reference.

TECHNICAL FIELD

A temperature activated trigger for opening a valve is provided to vent fluid from a tank.

BACKGROUND

Current pressure relief valve technology utilize temperature activated triggers, including the use of shape memory alloys that extend remotely from the valve, and about the exterior surface of the equipment (such as a tank) being protected from a first or a heat source. Heating of a portion of the temperature activated trigger, with consequent change in its shape, does not necessarily result in transmission of resultant tensile forces to effect displacement of the trigger so as to effect actuation of the valve to an open condition. This may occur when the temperature activated trigger is made from relatively elastic material which, rather than transmitting the produced tensile forces to effect the displacement of the trigger for actuation of the valve, becomes stretched by the tensile forces.

SUMMARY

In one aspect, there is provided a valve comprising a body, a passageway, a sealing member, and a trigger. The passageway is defined within the body, and includes an inlet and an outlet. The sealing member is configured for displacement between a closed position and an open position, wherein in the closed position, the sealing member prevents fluid communication between the inlet and outlet of the passageway, and in the open position, the inlet and the outlet of the passageway are disposed in fluid communication. The trigger includes a displaceable interference-effecting trigger portion configured for displacement from a first trigger position to a second trigger position. The displaceable interference-effecting trigger portion cooperates with the sealing member such that, while the displaceable interference-effecting trigger portion is disposed in the first trigger position, the displaceable interference-effecting trigger portion effects interference with displacement of the sealing member from one of the open position and the closed position to the other one of the open position and the closed position, and while the displaceable interference-effecting trigger portion is disposed in the second trigger position, the interference effected by the displaceable interference-effecting trigger portion, is removed. While the displaceable interference-effecting trigger portion is disposed in the second trigger position, the sealing member is displaceable from the closed position to the open position in response to a pressure differential, existing between the inlet and the outlet, which is greater than a minimum predetermined threshold pressure differential. The trigger further includes a temperature responsive trigger portion including a plurality of constituent trigger segments connected to one another in series, the constituent trigger segments including a plurality of temperature responsive trigger segments. Each one of the temperature responsive trigger segments, independently, includes a composite material, the composite material including: (a) a shape changing material-comprising component configured to assume a change in shape in response to receiving of heat energy by the temperature responsive trigger segment, and (b) a relatively inelastic material-comprising component having a modulus of elasticity that is greater than the modulus of elasticity of the shape changing material-comprising component.

In another aspect, there is provided a valve comprising a body, a passageway, a sealing member, and a trigger. The passageway is defined within the body, and includes an inlet and an outlet. The sealing member is configured for displacement between a closed position and an open position, wherein in the closed position, the sealing member prevents fluid communication between the inlet and outlet of the passageway, and in the open position, the inlet and the outlet of the passageway are disposed in fluid communication. The trigger includes a displaceable interference-effecting trigger portion configured for displacement from a first trigger position to a second trigger position. The displaceable interference-effecting trigger portion cooperates with the sealing member such that, while the displaceable interference-effecting trigger portion is disposed in the first trigger position, the displaceable interference-effecting trigger portion effects interference with displacement of the sealing member from one of the open position and the closed position to the other one of the open position and the closed position, and while the displaceable interference-effecting trigger portion is disposed in the second trigger position, the interference effected by the displaceable interference-effecting trigger portion, is removed. While the displaceable interference-effecting trigger portion is disposed in the second trigger position, the sealing member is displaceable from the closed position to the open position in response to a pressure differential, existing between the inlet and the outlet, which is greater than a minimum predetermined threshold pressure differential. The trigger further includes a temperature responsive trigger portion including a plurality of constituent trigger segments connected to one another in series, the constituent trigger segments including a plurality of temperature responsive trigger segments. Each one of the temperature responsive trigger segments, independently, includes a composite material, the composite material including: (a) a shape changing material-comprising component configured to assume a change in shape in response to receiving of heat energy by the temperature responsive trigger segment, and (b) a relatively inelastic material-comprising component having a stiffness that is greater than the stiffness of the shape changing material-comprising component.

In another aspect, there is provided a valve comprising a body, a passageway, a sealing member, and a trigger. The passageway is defined within the body, and includes an inlet and an outlet. The sealing member is configured for displacement between a closed position and an open position, wherein in the closed position, the sealing member prevents fluid communication between the inlet and outlet of the passageway, and in the open position, the inlet and the outlet of the passageway are disposed in fluid communication. The trigger includes a displaceable interference-effecting trigger portion configured for displacement from a first trigger position to a second trigger position. The displaceable interference-effecting trigger portion cooperates with the sealing member such that, while the displaceable interference-effecting trigger portion is disposed in the first trigger position, the displaceable interference-effecting trigger portion effects interference with displacement of the sealing member from one of the open position and the closed position to the other one of the open position and the closed position, and while the displaceable interference-effecting trigger portion is disposed in the second trigger position, the interference effected by the displaceable interference-effecting trigger portion, is removed. While the displaceable interference-effecting trigger portion is disposed in the second trigger position, the sealing member is displaceable from the closed position to the open position in response to a pressure differential, existing between the inlet and the outlet, which is greater than a minimum predetermined threshold pressure differential. The trigger further includes a temperature responsive trigger portion including a plurality of constituent trigger segments connected to one another, in series, the constituent trigger segments including: (a) a shape changing temperature responsive trigger segment configured for assuming a change in shape in response to receiving of heat energy, and (b) one or more relatively inelastic trigger segments, each one of the one or more relatively inelastic trigger segments having a modulus of elasticity that is greater than the modulus of elasticity of the shape changing temperature responsive trigger segment.

In another aspect, there is provided a valve comprising a body, a passageway, a sealing member, and a trigger. The passageway is defined within the body, and includes an inlet and an outlet. The sealing member is configured for displacement between a closed position and an open position, wherein in the closed position, the sealing member prevents fluid communication between the inlet and outlet of the passageway, and in the open position, the inlet and the outlet of the passageway are disposed in fluid communication. The trigger includes a displaceable interference-effecting trigger portion configured for displacement from a first trigger position to a second trigger position. The displaceable interference-effecting trigger portion cooperates with the sealing member such that, while the displaceable interference-effecting trigger portion is disposed in the first trigger position, the displaceable interference-effecting trigger portion effects interference with displacement of the sealing member from one of the open position and the closed position to the other one of the open position and the closed position, and while the displaceable interference-effecting trigger portion is disposed in the second trigger position, the interference effected by the displaceable interference-effecting trigger portion, is removed. While the displaceable interference-effecting trigger portion is disposed in the second trigger position, the sealing member is displaceable from the closed position to the open position in response to a pressure differential, existing between the inlet and the outlet, which is greater than a minimum predetermined threshold pressure differential. The trigger further includes a temperature responsive trigger portion including a plurality of constituent trigger segments connected to one another, in series, the constituent trigger segments including: (a) a shape changing temperature responsive trigger segment configured for assuming a change in shape in response to receiving of heat energy, and (b) one or more relatively inelastic trigger segments, each one of the one or more relatively inelastic trigger segments having a stiffness that is greater than the stiffness of the shape changing temperature responsive trigger segment.

DESCRIPTION OF THE DRAWINGS

The embodiments will now be described with reference to the following drawings, in which.

DETAILED DESCRIPTION

Figure 1:
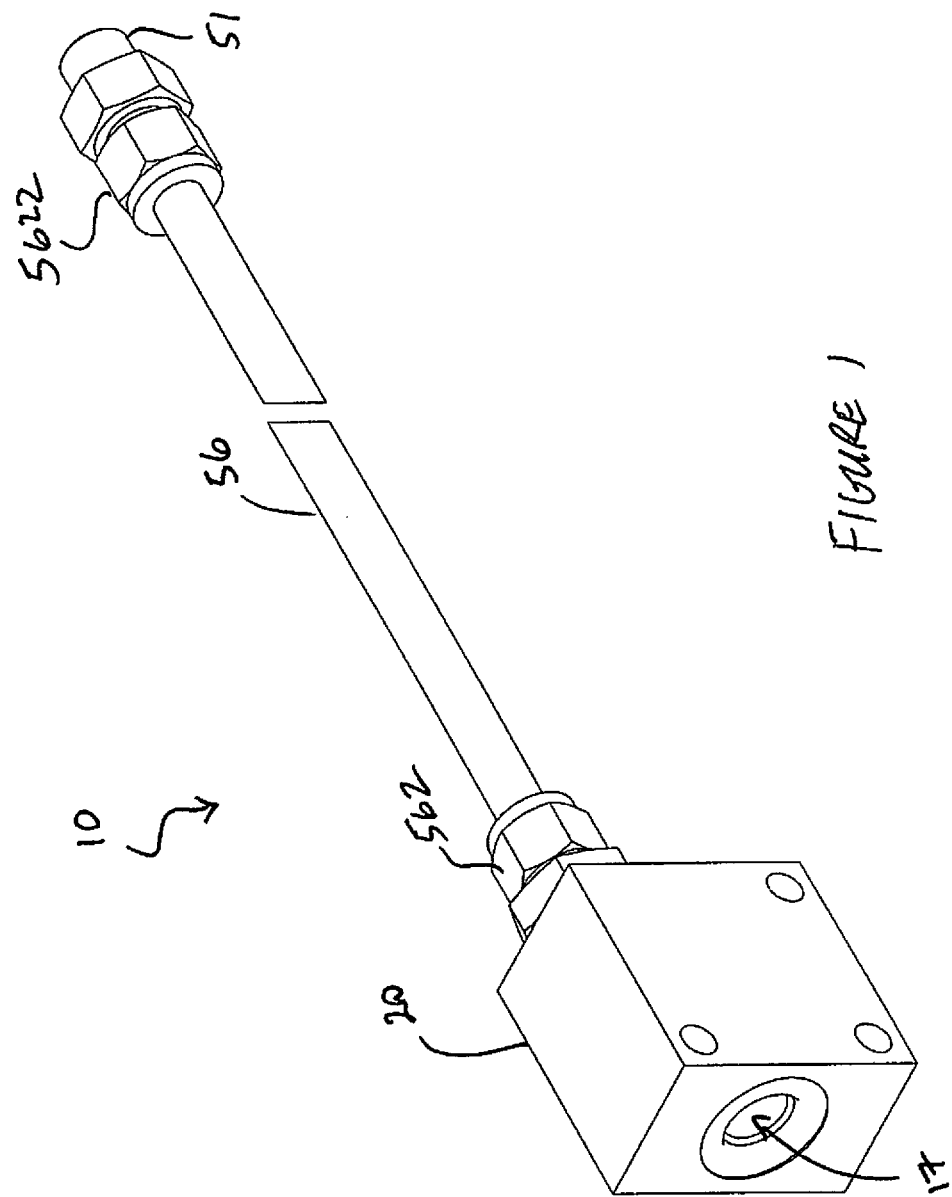
FIG. 1 is an isometric view of a first embodiment of a valve showing the trigger partially in fragment.
Figure 2:
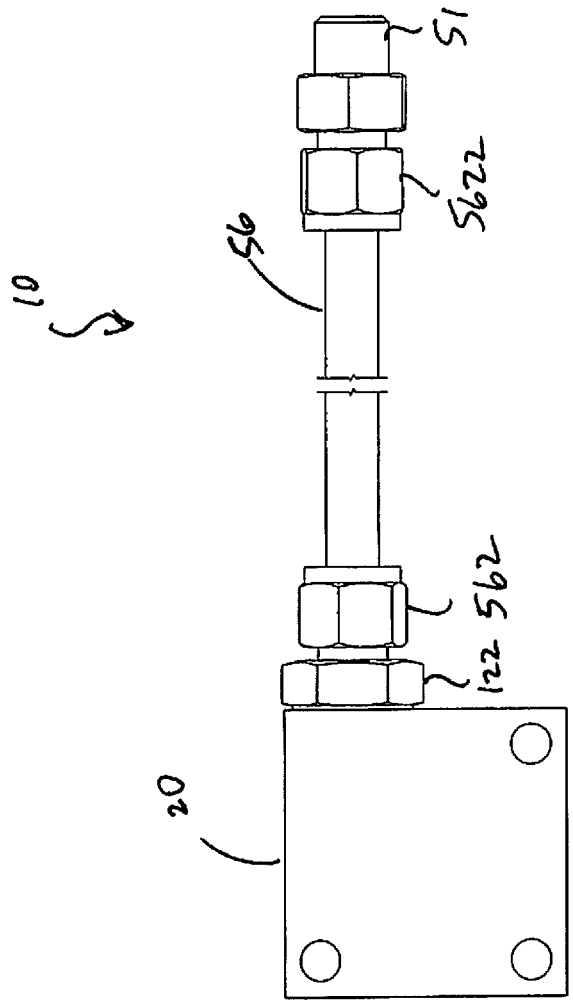
FIG. 2 is a top plan view of the valve of FIG. 1.
Figure 3:
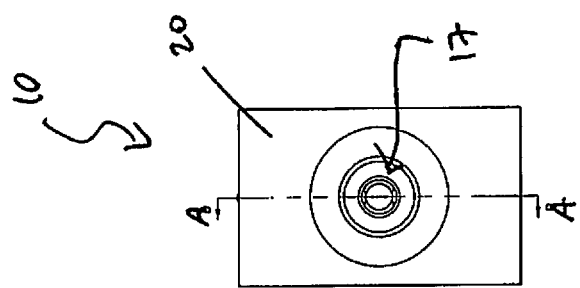
FIG. 3 is an elevation view from one end of the valve of FIG. 1.

Referring to FIGS. 1 to 5, there is provided an embodiment of a valve 10 for attachment, either directly or indirectly, to an opening (such as a port) of a container such as, for example, a vessel or tank containing liquids or gases held under pressure such as the tank 200 depicted in FIGS. 15 and 16. The valve 10 comprises a body 20, a passageway 30, a sealing member 160, and a trigger 130.

The valve 10 can be used in a variety of applications including, but not limited to, venting a pressure vessel when the vessel is exposed to extreme heat or fire in order to avoid an explosion, or venting a tank of fire suppressant onto a fire in the area protected by the trigger.

Figure 8:
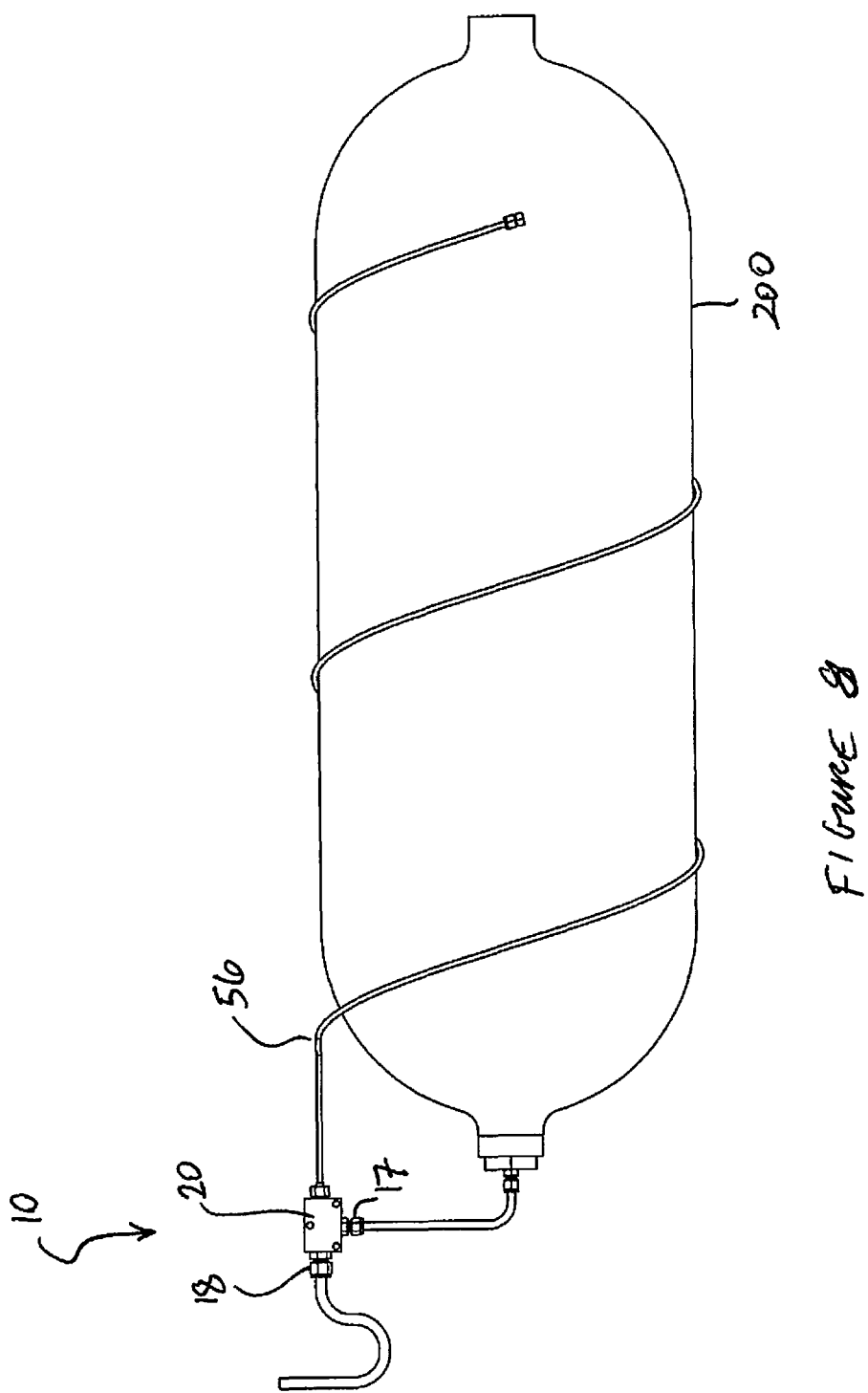
FIG. 8 is a side view of the valve of FIG. 1 attached to a tank.
Figure 9:
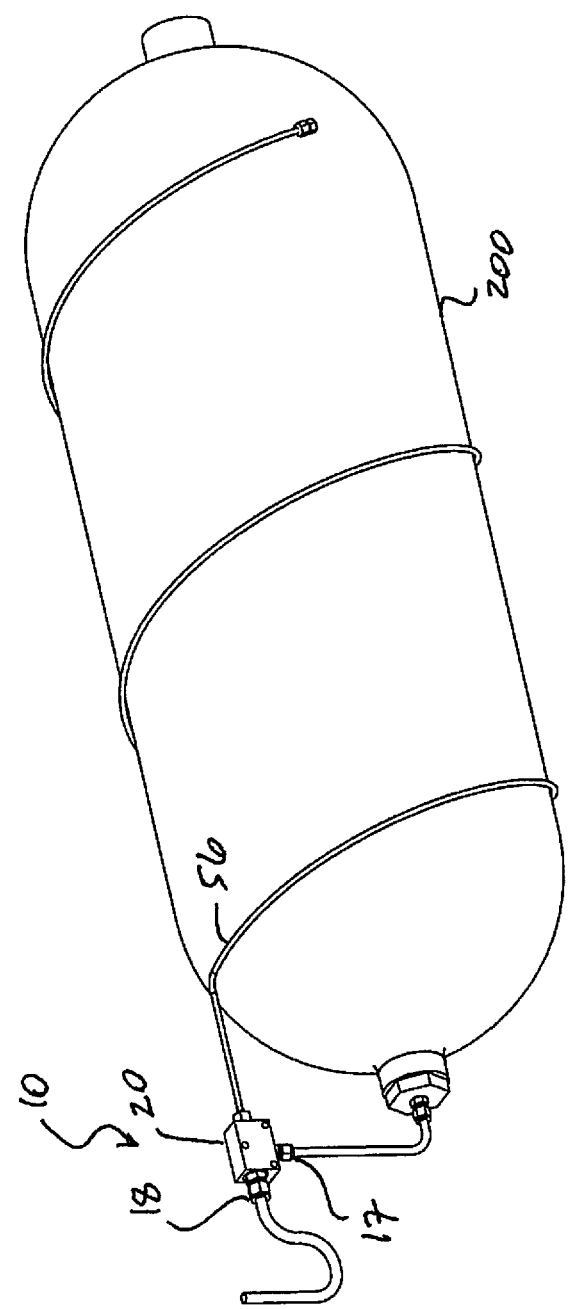
FIG. 9 is an isometric top view of the valve of FIG. 1 attached to a tank.

The body 20 includes a passageway 30 having an inlet 17 and an outlet 18. In some embodiments, for example, the body 20 may includes more than one inlet, more than one outlet, or both of more than one inlet and more than one outlet. The inlet 17 can be configured for attachment to an opening (such as a port) of a container, either directly or indirectly. An embodiment of the invention attached indirectly to a tank 200 is illustrated in FIGS. 8 and 9. For example, the material of the body 20 is metallic. Suitable metallic materials include brass, aluminum, or stainless steel.

The sealing member 160 is configured for displacement between a closed position and an open position. In the closed position, (see FIG. 5), the sealing member 160 prevents fluid communication between the inlet 17 and outlet 18 of the passageway 30 In the open position (see FIG. 4), the inlet 17 and the outlet 18 of the passageway 30 are in fluid communication, allowing for gas or liquid to flow from the inlet 17 to the outlet 18. For example, the sealing member 160 includes a sealing member body which carries an o-ring for effecting sealing engagement of the sealing member 160 to the passageway 30, such that fluid is prevented from flowing from the inlet 17 to the outlet 18 while the sealing member 160 is disposed in the closed position. The sealing member body is made from one or more of a variety of materials including metal. For example, a suitable metal is steel. The o-ring may be made from elastomeric material.

In some embodiments, for example, the displacement of the sealing member 160 is effected by movement of the sealing member 160 within the passageway 30. In this respect, by virtue of the geometry of the passageway 30, the movement of the sealing member 160 is directed by the passageway 30.

Figure 4:
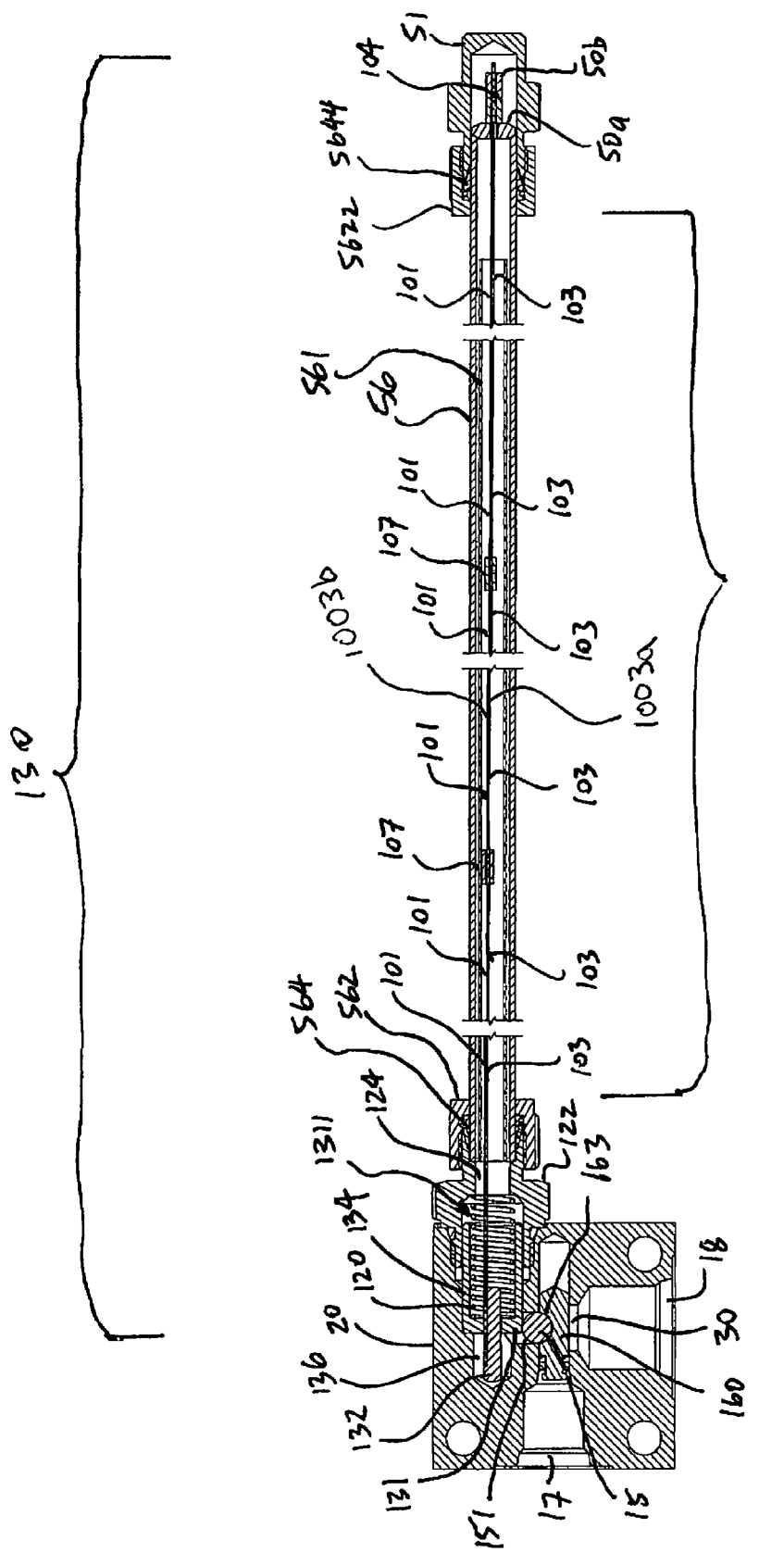
FIG. 4 is cross-sectional view of the valve of FIG. 1, taken along lines A-A in FIG. 3, with the trigger partially in fragment, and showing the sealing member in the closed position.
Figure 5:
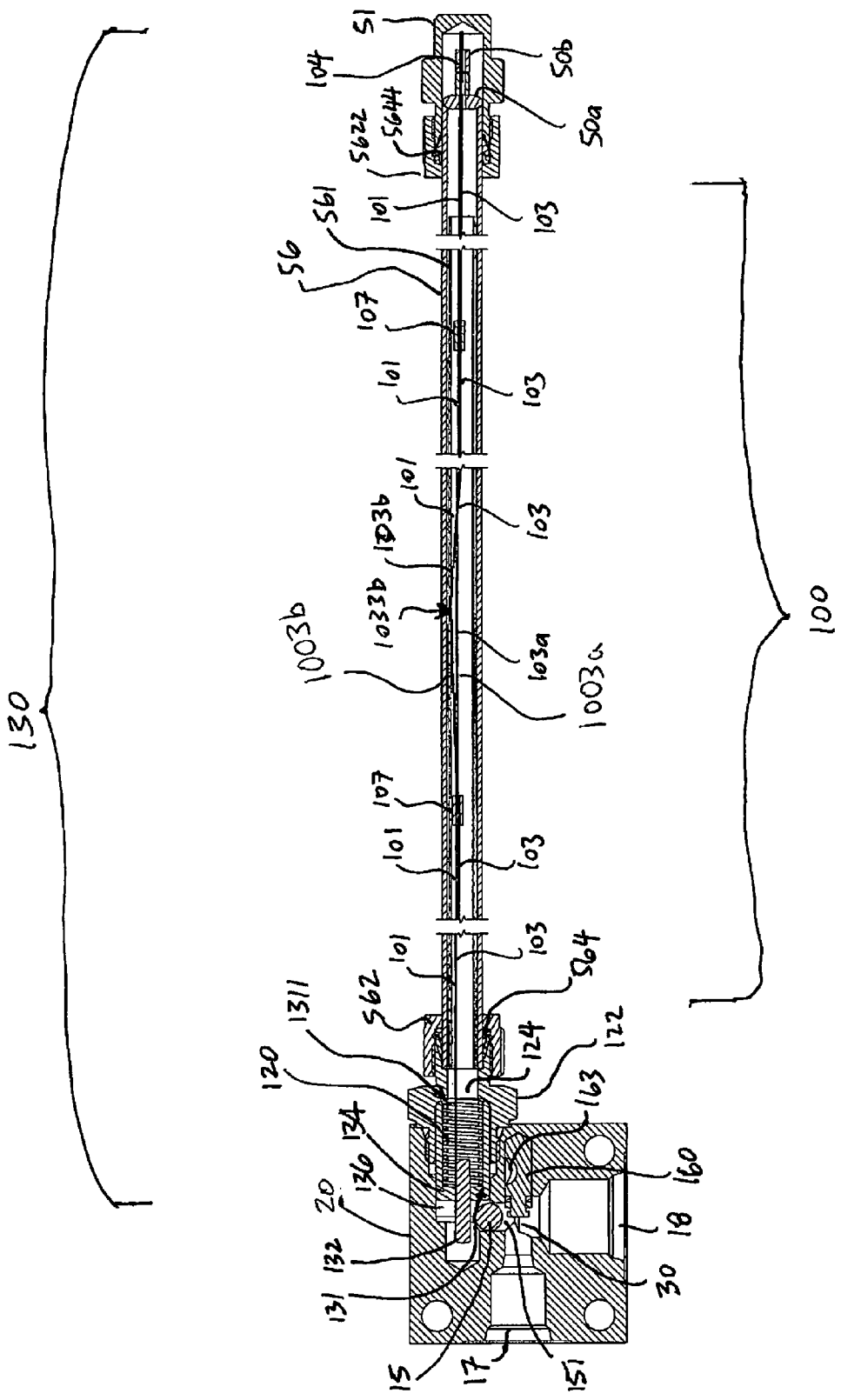
FIG. 5 is cross-sectional view of the valve of FIG. 1, taken along lines A-A in FIG. 3, with the trigger partially in fragment, and showing the sealing member in the open position.
Figure 6:
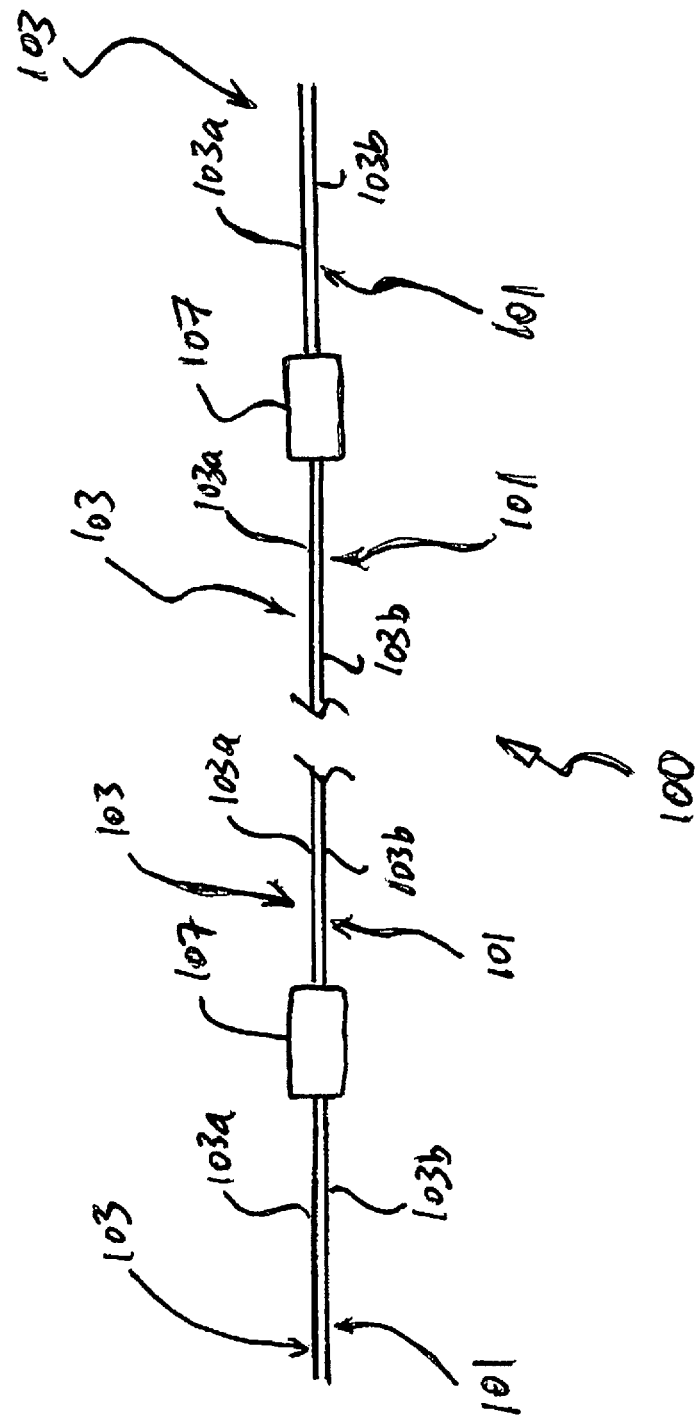
FIG. 6 is a top plan view of a portion of an embodiment of the trigger of the valve in FIG. 1, partially in fragment.
Figure 7:
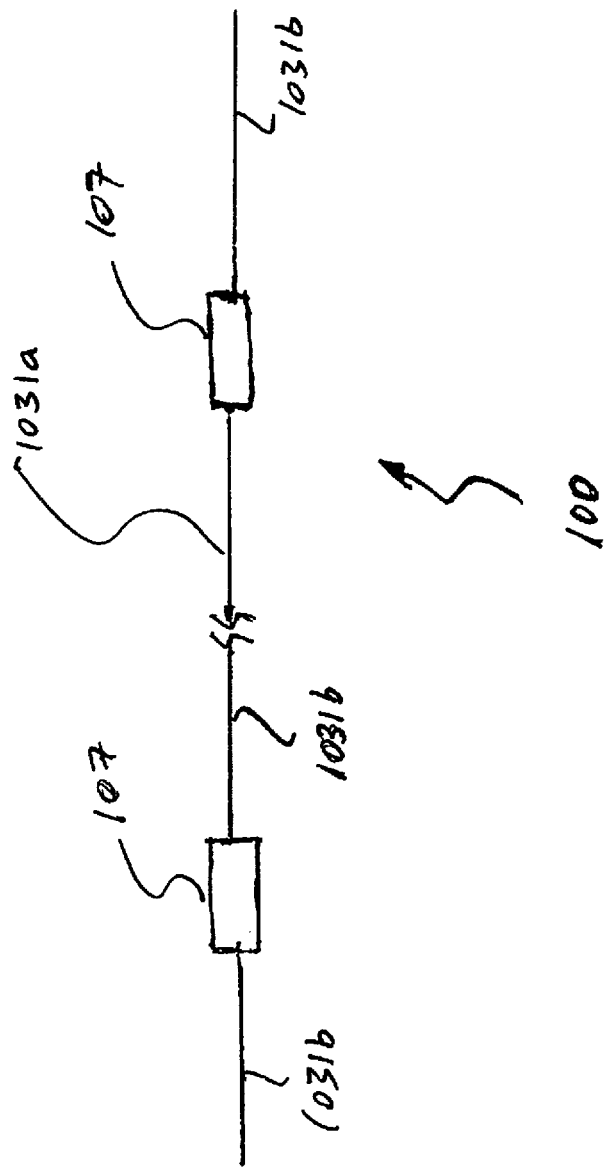
FIG. 7 is a top plan view of a portion of another embodiment of the trigger of the valve in FIG. 1, partially in fragment.

The trigger 130 includes a displaceable interference-effecting portion 131. As illustrated in FIGS. 4 and 5, the displaceable interference-effecting portion 131 is configured for displacement between a first trigger position and a second trigger position. In the first trigger position, the displaceable interference-effecting portion 131 effects interference with displacement of the sealing member 160 from one of the open position and the closed position to the other one of the open position and the closed position (FIGS. 4 and 5). In some embodiments, for example, while the displaceable interference-effecting portion 131 is in the first trigger position, the portion 131 extends into the passageway 30, thereby effecting interference to the movement of the sealing member 160 within the passageway 30, and thereby effecting interference with the displacement of the sealing member 160. Displacement of the displaceable interference-effecting portion 131 from the first trigger position, as depicted in FIG. 4, to the second trigger position, as depicted in FIG. 5, removes the interference effected by the displaceable interference-effecting portion 131 to the movement of the sealing member 160.

It is also contemplated that in other embodiments, the sealing member 160 may be disposed in the open position so long as the displaceable interference-effecting portion 131 is disposed in the first trigger position, and the sealing member 160 is disposed for displacement to the closed position when the displaceable interference-effecting portion 131 is disposed in the second trigger position.

In some embodiments, while the displaceable interference-effecting portion 131 is disposed in the second trigger position, the sealing member 160 is displaceable from the closed position to the open position in response to a sufficient pressure differential provided between the inlet 17 and the outlet 18 (i.e. while the displaceable interference-effecting portion 131 is disposed in the second trigger position, the sealing member 160 is displaced from the closed position to the open position when the pressure differential between the inlet 17 and the outlet 18 exceeds a predetermined minimum pressure differential). In some of these embodiments, for example, the inlet 17 is disposed in fluid communication with a container (such as the tank 200), and is, thereby, exposed to fluid pressure within the container, and the outlet 18 is disposed in fluid communication with the atmosphere and is, thereby, exposed to atmospheric pressure, such that, so long as the fluid pressure within the container exceeds atmospheric pressure by a predetermined minimum threshold amount, and so long as the displaceable interference-effecting portion 131 is disposed in the second trigger position, the sealing member will become displaced from closed position to the open position. In some embodiments, for example, the predetermined minimum threshold amount is at least 50 psi.

The trigger 130 further includes a temperature responsive trigger portion 100. The temperature responsive trigger portion 100 is configured to effect the displacement of the displaceable interference-effecting portion 131 (and, therefore, the trigger) in response to receiving of heat energy by at least a portion of the temperature responsive trigger portion 100. In response to the receiving of heat energy, the at least a portion of the temperature responsive trigger portion effects exertion of a tensile force on the displaceable interference-effecting portion 131, thereby effecting the displacement of the displaceable interference-effecting portion 131, and thereby effecting removal of the interference to the displacement of the sealing member 160, such that the sealing member 160 becomes displaceable, from one of the open position and the closed position to the other one of the open position and the closed position, in response to a pressure differential, existing between the inlet 17 and the outlet 18, which exceeds a minimum predetermined threshold pressure differential. In some of these embodiments, for example, the receiving of heat energy by at least a portion of the temperature responsive trigger portion 100 effects a change in shape of the trigger such that the displacement of the displaceable interference-effecting portion 131 is effected. In some of these embodiments, for example, the trigger includes a longitudinal axis, and the change in shape includes a reduction in length of the trigger along its longitudinal axis.

A fire or other heat source which can effect displacement of the trigger 130, as above-described, can also effect heating of the tank 200 to which the valve 10 is attached. In such cases, in an embodiment of the invention, the movement of the trigger 130 is effected by the heat before the heating of the tank 200 effects the failure of the tank 200. "Failure" of the tank 200 occurs when the integrity of the tank 200 is compromised, such as by, for example, rupturing, breaking or melting.

In some embodiments, for example, the displacement of the displaceable interference-effecting portion 131 from the first trigger position to the second trigger position can directly effect displacement of the sealing member 160, whereas in other embodiments, (as illustrated in the embodiment shown in FIGS. 4 and 5), the displacement of the displaceable interference-effecting portion 131 from the first position to the second position indirectly effects displacement of the sealing member 160. In FIG. 4, for example, the displaceable interference-effecting portion 131 is retaining an intermediate member, in this case, a single ball 15, against the sealing member 160 and is thereby interfering with displacement of the sealing member 160 from one of the open position and the closed position (in this case, the closed position) to the other one of the open position and the closed position (in this case, the open position) by a sufficient fluid pressure differential, between the inlet 17 and the outlet 18. In the embodiment shown in FIG. 4, the ball 15 is used to transmit most of the force applied to the sealing member 160, by the pressure exerted from the fluid contents of the tank, onto the body 20, while transmitting a smaller force onto the displaceable interference-effecting portion 131. The use of the ball 15 as an intermediate member results in less frictional resistance to the displaceable interference-effecting portion 131 when it is displaced by tensile forces exerted by a temperature responsive trigger portion 100 (see below), compared to when there is no intermediate member and the displaceable interference-effecting portion 131 is directly engaged to the sealing member 160. This allows for greater flexibility in the choice of materials for the temperature responsive portion 100, which may, for example, be a wire (for example, comprising a shaped memory alloy). For example, the material of construction of the ball 15 is steel and the diameter of the ball is 0.250 inches.

In some embodiments, for example, such as in the embodiment illustrated in FIG. 4, while the displaceable interference-effecting portion 131 is disposed in the first trigger position, the ball 15 is restrained by the displaceable interference-effecting portion 131 within a groove or cut-out 163 of the sealing member 160 to assume an interference relationship disposition with respect to the sealing member 160, such that interference with the displacement of the sealing member 160 from one of the open position and the closed position to the other one of the open position and the closed position is thereby effected. Relative to the first embodiment, the configuration of the interference relationship between the ball 15 and the sealing member 160 of the second embodiment facilitates the provision of a shorter sealing member 160, thereby reducing overall space requirements. As well, relative to the first embodiment, the configuration of the interference relationship between the ball 15 and the sealing member 160 of the second embodiment reduces the risk of inadvertent movement of the sealing member 160 (for example, inadvertent opening if the sealing member 160 is normally in a closed position, or, as another example, inadvertent closing if the sealing member 160 is normally in an open position) if the valve 10 is installed incorrectly such that a higher pressure is provided at the outlet 18 relative to the inlet 17.

In some embodiments, the ball 15 is disposed in a passage 151 which is drilled through the body 20. In some embodiments, and referring to FIGS. 4 and 5, the passage 151 is drilled through the outlet 18. Relative to the first embodiment, the manner of formation of the passage 151 in the second embodiment reduces the number of manufacturing operations and the number of components.

In some embodiments, for example, the body 20 also defines a passageway 136 which directs the movement of the trigger 130. In this respect, the trigger is configured for slideable movement within the passageway, and the displacement of the trigger 130 between the closed position and the open position is effected by slideable movement of the trigger 130 within the passageway 136.

In some embodiments, the valve 10 also includes a trigger retainer 50 connected to a retained trigger portion 104 of the trigger 130. The retained trigger portion 104 is remote from the displaceable interference-effecting portion 131. The trigger retainer 50 functions to resist displacement of the retained trigger portion 104. By effecting the connection of the retained trigger portion 104 to the trigger retainer 50, displacement of the displaceable interference-effecting portion 131, effected in response to the receiving of heat energy by at least a portion of the temperature responsive trigger portion 104, is more pronounced (such as, for example, a greater displacement) than the case where there is no trigger retainer 50 that is connected to a portion (i.e. the retained trigger portion 104) of the trigger 130. In some embodiments, for example, the connection of the retained trigger portion 104 to the trigger retainer 50 is such that the retained trigger portion 104 is fixed or substantially fixed such that receiving of heat energy by at least a portion of the temperature responsive trigger portion 100 effects displacement of the displaceable interference-effecting portion 131 such that the displacement of the displaceable interference-effecting portion 131, from the first trigger position to the second trigger position, is effected. In some embodiments, for example, the connection of the retained trigger portion 104 to the trigger retainer 50 is such that the spatial disposition of the retained trigger portion 104 is fixed, or substantially fixed, relative to the valve body 20, or is configured to be fixed, or substantially fixed, relative to the valve body.

In some embodiments, for example, for effecting the fixing, or substantial fixing, of the spatial disposition of the retained trigger portion 104 relative to the body 20 by the trigger retainer 50, the trigger retainer 50 is connected to the body 20 (such as by connector 56). In other embodiments, for example, the trigger retainer 50 is configured to effects indirect connection of the retained trigger portion 104 of the temperature responsive trigger actuator 100 to a component which is independently connected to the valve body 20. For example, in some of these other embodiments, the trigger retainer 50 includes a strap, band or other fastener for securing the retained trigger portion of the temperature responsive trigger portion 100 directly or indirectly to the tank 200 to which the valve 10 is connected. In this respect, such fastener functions to effect fixing, or substantial fixing, of the spatial disposition of the retained trigger portion 104 relative to the body 20 of the valve 10.

In some of these embodiments, for example, to effect coupling of the retained trigger portion 104 of the trigger 130 to the body 20, the trigger retainer 50 is in the form of an assembly of a washer 50a, a crimp 50b, and the connector 56. The washer 50a rests in an interference relationship with the connector 56 with the effect that displacement of the washer 50b in a direction towards the displaceable interference-effecting portion is restricted by the connector 56. The trigger 130 extends through a passageway (i.e. hole) provided in the washer 50a, and the crimp 50b is clamped to a portion of the trigger 130 to provide a geometry with the effect that displacement of the clamped portion (i.e. the retained trigger portion 104) in a direction towards the displaceable interference-effecting portion 130a (and through the hole in the washer 50a) is restricted by the washer 50a, which is disposed in the above-described interference relationship with the connector 56. The connector 56 extends from the washer 50a to the body 20 and is in turn coupled to the spring retainer 122 (to be described in further detail below) which is fastened to the body 20. For example, the connector 56 is made from metallic material, and suitable metallic materials includes copper, stainless steel, brass or aluminum, or a combination of said materials. The connector 56 is stiffer than the temperature responsive trigger portion 100.

In some embodiments, for example, the temperature responsive trigger portion 100 is disposed within a sleeve 561 disposed within the connector 56. The sleeve 561 functions to reduce friction between the temperature responsive trigger portion 100 and the connector 56, during travel of the temperature responsive trigger portion 100 through the connector, in parallel with the displacement of the displaceable interference-effecting portion 131. In some embodiments, for example, the sleeve 561 is disposed in interference fit relationship with the connector 56. In some embodiments, for example, the sleeve 561 is made from a plastic, such as polytetrafluoroethylene. In some embodiments, for example, the sleeve 561 is made from TEFLON™.

In some embodiments, for example, the assembly of the connector 56, the washer 50a, and the crimp 50b may be closed or covered by a cap 51 which is connected to the connector 56. Fastening of the connector 56 is effected with a nut 5622, which is threaded to the cap 51, and which forces a ferrule 5644 to pinch the connector 56. In this respect, during assembly, the nut 5622 and the ferrule 5644 are slid over the end of the connector 56 which is desired to be fastened to the cap 51. The connector 56 is then pushed into an aperture provided within the cap 51. The nut 5622 is then tightened until the ferrule 5644 squeezes the connector 56. For example, the cap 51 is made using metallic material, such as brass or stainless steel. In some embodiments, for example, the cap 51 functions to cover the assembly of the trigger retainer 50 to, amongst other things, prevent, or mitigate, material ingress or physical damage.

In some embodiments, for example, the temperature, at which the temperature responsive trigger portion 100 assumes a change in shape, is modified with a shape changing temperature modification assembly 1311. The shape changing temperature modification assembly 1311 includes a pin 132, a biasing member 120, and a spring housing 134. The spring housing 134 is for housing the biasing member 120. The temperature responsive trigger portion 100 is pinched between the pin 132 and the spring housing 134. In some embodiments, for example, such as the embodiment illustrated in FIGS. 4 and 5, the displaceable interference-effecting portion 131 is defined on an exterior surface of the spring housing 134. For example, the material of the spring housing 134 is metallic. Suitable metallic materials include brass, aluminum, or stainless steel. For example, the material of the pin 132 is a metal, such as steel. The biasing member 120 effects application of a force to the temperature responsive trigger portion 100 to effect modification of its shape changing temperature characteristics. For example, the biasing member is a resilient member, such as a spring 120, as depicted in FIGS. 4 and 5. For example, the spring 120 is a coil spring made from steel. For example, the spring 120 is disposed within space provided by the spring housing member 134, and is retained within space by spring retainer 122. Spring retainer 122 is fastened to the body 20. For example, the spring retainer 122 is made from metallic material, such as brass or stainless steel. For example, the spring retainer 122 is in the form of a nut which threads into complementary threads provide on an external surface of the body 20, and presses against the spring housing 124 against the body 20 to thereby effected disposition of the spring housing 134 between the spring retainer 122 and the body 20. The spring retainer 122 includes a passage 124 which slidably receives the temperature responsive trigger portion 100 so as to facilitate the connection of the temperature responsive trigger portion 100 to the displaceable interference-effecting portion 131 (defined, in this embodiments, by the shape changing temperature modification assembly 1311) and also to facilitate displacement of the trigger 130 in response to heating, as described herein.

As alluded to above, in some embodiments, for example, the connector 56 is fastened to the spring retainer 122, thereby effecting coupling of the connector 56 to the body 20. For example, fastening of the connector 56 is effected with a nut 562, which is threaded to the spring retainer 122, and which forces a ferrule 564 to pinch the connector 56. In this respect, during assembly, the nut 562 and the ferrule 564 are slid over the end of the connector 56 which is desired to be fastened to the spring retainer 122 (and, therefore, the body). The connector 56 is then pushed through the passage 124 provided on the spring retainer 122. The nut 562 is then tightened until the ferrule 564 squeezes the connector 56.

The shape changing temperature modification assembly 1311, the temperature responsive trigger portion 100, and the trigger retainer 104 co-operate with the effect that opposition is effected to the force applied by the biasing member 120 such that a resulting tensile force is applied to the temperature responsive trigger portion 100 sufficient to effect a modification to a shape-changing temperature of at least one portion of the temperature responsive trigger portion 100 so as to provide at least one shape-changing temperature-modified trigger portion. In this respect, in some embodiments, for example, one or more portions of the temperature responsive trigger portion 100 are configured, each, independently, to assume a change in shape in response to receiving of heat energy by the one or more portions, even in the absence of the tensile force being applied by the biasing member 120, such that the shape change contributes to the displacement of the displaceable interference-effecting portion 131. While the biasing member 120 is applying the tensile force to the temperature responsive trigger portion 100, the respective shape-changing temperature, of each one of these one or more portions, is modified, so as to better suit the contemplated application of the valve 10.

Referring to FIGS. 8 and 9, and as alluded to above, in some embodiments, for example, the valve 10 is connected to a port of a tank 200. In this respect, the temperature responsive trigger portion 100 is positioned about the tank 200 such that the temperature responsive trigger portion 100 encircles the tank 200 for purposes of increasing the amount of space next to the tank for which the temperature responsive trigger portion 100 is operative for responding to a heat source that is present in such space.

First Aspect

In one aspect, the temperature responsive trigger portion 100 includes a plurality of constituent trigger segments 101 connected to one another in series. The constituent trigger segments include a plurality of temperature responsive trigger segments 103 (in the embodiment illustrated, each one of the constituent trigger segments 101 is a temperature responsive trigger segment 103, but this does not necessarily have to be the case). Each one of the temperature responsive trigger segments, independently, includes a composite material. The composite material includes: (a) a shape changing material-comprising component 103a configured to assume a change in shape in response to receiving of heat energy by the temperature responsive trigger segment, and (b) a relatively inelastic material-comprising component 103b.

In one sub-aspect, the relatively inelastic material-comprising component 103b has a modulus of elasticity that is greater than the modulus of elasticity of the shape changing material-comprising component 103a. In some embodiments, for example, the relatively inelastic material-comprising component 103b has a modulus of elasticity that is greater than the modulus of elasticity of the shape changing material-comprising component by a factor of at least two (2), such as, for example, at least five (5), or such as, for example, at least ten (10).

In another sub-aspect, the relatively inelastic material-comprising component 103b has a stiffness that is greater than the stiffness of the shape changing material-comprising component 103a. In some embodiments, for example, the relatively inelastic material-comprising component 103b has a stiffness that is greater than the stiffness of the shape changing material-comprising component by a factor of at least two (2), such as, for example, at least five (5), or such as, for example, at least ten (10).

In some embodiments, for example, the relatively inelastic material-comprising component 103b has a minimum diameter of at least 0.010 inches. In some embodiments, for example, the relatively inelastic material-comprising component 103b has a minimum diameter of at least 0.015 inches. In some embodiments, for example, the relatively inelastic material-comprising component 103b has a minimum diameter of 0.020 inches.

In some embodiments, for example, each one of the temperature responsive trigger segments 103, independently, is configured for exerting a tensile force, in response to receiving of heat energy, such that the tensile force exerted by one or more of the temperature responsive trigger segments 103 which have received heat energy, effects the displacement of the displaceable interference-effecting trigger portion 131 from the first trigger position to the second trigger position.

In some embodiments, for example, wherein the effected change in shape, of the temperature responsive trigger segment 103, includes a contraction of the temperature responsive trigger segment 103.

In some embodiments, for example, the effected change in shape, of the temperature responsive trigger segment 103, includes a reduction in length of the temperature responsive trigger segment 103, along its longitudinal axis.

In some embodiments, for example, the exertion of a tensile force by one or more of the temperature responsive trigger segments 103 is effected in response to, for each one of the one or more tensile force-exerting temperature responsive trigger segments 103, independently, a changing in shape of the temperature responsive trigger segment 103 effected by the respective shape changing material-comprising component 103a in response to receiving of heat energy by the temperature responsive trigger segment 103. In some embodiments, for example, the changing in shape (such as a contraction, or length reduction) results in "pulling" of the displaceable interference-effecting trigger portion 131, effecting the displacement of the displaceable interference-effecting trigger portion 131.

In some embodiments, for example, the constituent trigger segments 101 are co-operatively configured such that tensile force, exerted by one or more of the temperature responsive trigger segments 103, in response to, for each one of the one or more tensile force-exerting temperature responsive trigger segments 103, receiving of heat energy by the temperature responsive trigger segment 103, is not absorbed, by the other ones of the constituent trigger segments 101 (i.e. the ones that are not exerting a tensile force), to a sufficient extent to prevent transmission of a sufficient fraction of the tensile force to the displaceable interference-effecting portion 131 for effecting the displacement of the displaceable interference-effecting trigger portion 131 from the first trigger position to the second trigger position. This displacement of the displaceable interference-effecting trigger portion 131, from the first trigger position to the second trigger position, is effected in response to the receiving of heat energy by the one or more temperature responsive trigger segments 103.

In some embodiments, for example, for each one of the temperature responsive trigger segments 103, independently, the relatively inelastic material-comprising component 103b is spatially disposed relative to the shape changing material-comprising component 103a such that an application of heat to the temperature responsive trigger segment 103, sufficient to effect a changing in shape of the shape changing material-comprising component 103a, also renders the relatively inelastic material-comprising component 103b sufficiently deformable. In some embodiments, for example, the application of heat to the temperature responsive trigger segment 103, sufficient to effect a changing in shape of the shape changing material-comprising component 103a, and while effect a changing in shape of the shape changing material-comprising component 103a, effects sagging or buckling of the relatively inelastic material-comprising component 103 (see reference numeral 1033b in FIG. 5). This has the effect that, a changing in shape of the effect a changing in shape of the shape changing material-comprising component 103a, in response to receiving of heat energy by the temperature responsive trigger segment 103, is not resisted by the relatively inelastic material-comprising component 103b to a sufficient extent to prevent transmission of a tensile force, exerted by the corresponding temperature responsive trigger segment 103 in response to the changing in shape of the temperature responsive trigger segment 103, to the displaceable interference-effecting trigger portion 131.

In some embodiments, for example, while a tensile force is being exerted by one or more temperature responsive trigger segments 103, in response to, for each one of the one or more tensile force-exerting temperature responsive trigger segments 103, independently, a shape change of the temperature responsive trigger segments 103 effected by the receiving of applied heat energy by the temperature responsive trigger segment 103, the relatively inelastic material-comprising components 103b of the other ones of the temperature responsive trigger segments 103 are, co-operatively, sufficiently inelastic such that the exerted tensile force is not absorbed, by the other ones of the temperature responsive trigger segments 103, at least to a sufficient extent to prevent transmission of a sufficient fraction of the tensile force to the displaceable interference-effecting trigger portion 131 for effecting displacement of the displaceable interference-effecting trigger portion 131 from the first trigger position to the second trigger position. Absorption of the exerted tensile force, by the other ones of the temperature responsive trigger segments 103, could have the effect that the exerted tensile force is not transmitted to the displaceable interference-effecting trigger portion 131, and does not effect displacement of the displaceable interference-effecting trigger portion 131 from the first trigger position to the second trigger position.

In some embodiments, for example, the shape changing material-comprising component 103a of one or more temperature responsive trigger segments 103 is configured such that, in response to receiving of heat energy by the one or more heat-received temperature responsive trigger segments 103, simultaneously, the effected change in shape of the shape changing material-comprising component 103a of all of the one or more heat-received temperature responsive trigger segments 103 effects the displacement of the displaceable interference-effecting trigger portion 131 from the first trigger position to the second trigger position. In some of these embodiments, for example, the effected change in shape of the shape changing material-comprising component 130a of all of the one or more heat-received temperature responsive trigger segments 103 effects a contraction of the heat-received temperature responsive trigger segments 103 such that the displaceable interference-effecting trigger portion 131 is displaced from the first trigger position to the second trigger position. In other ones of these embodiments, for example, the effected change in shape of the shape changing material-comprising component 103a of all of the one or more heat-received temperature responsive trigger segments 103 effects a reduction in length of the heat received temperature responsive trigger segments 103, along every one of their respective longitudinal axes, such that the displaceable interference-effecting trigger portion 131 is displaced from the first trigger position to the second trigger position.

In some embodiments, for example, segment dividers 107 are provided, for effecting an interface between consecutive constituent trigger segments 103, such that a plurality of segment dividers 107 is provided.

Figure 10:
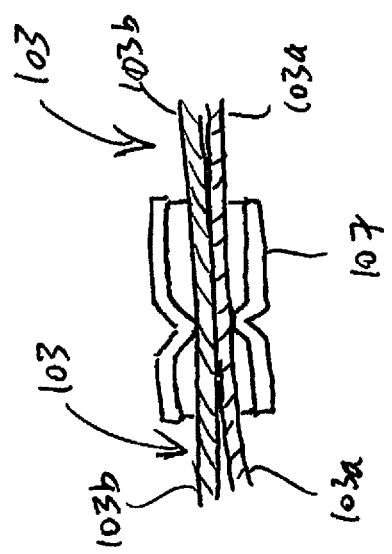
FIG. 10 is a schematic illustration of one embodiment of a segment divider of the valve of FIG. 1, effecting division of two separate trigger segments.

In some embodiments, for example, and such as the embodiment illustrated in FIG. 10, a single member 1003a (such as a wire) defines the shape changing-material comprising components 103a of all of the constituent trigger segments 103, and a single member 1003b (such as a wire) defines the relatively inelastic material-comprising components 103b of all of the constituent trigger segments 103, and the segment dividers 107 are crimps, and each one of the crimps pinches, simultaneously a portion of the member 1003a and a corresponding portion of the member 1003b, at different locations along the members 1003a, 1003b, thereby dividing the members 1003a, 1003b into separate trigger segments 103, each one of these trigger segments 103 including components 103a, 103b, the component 103a corresponding to a portion or section of the member 1003a, and the component 103b corresponding to a portion or section of the member 1003b.

Figure 11:
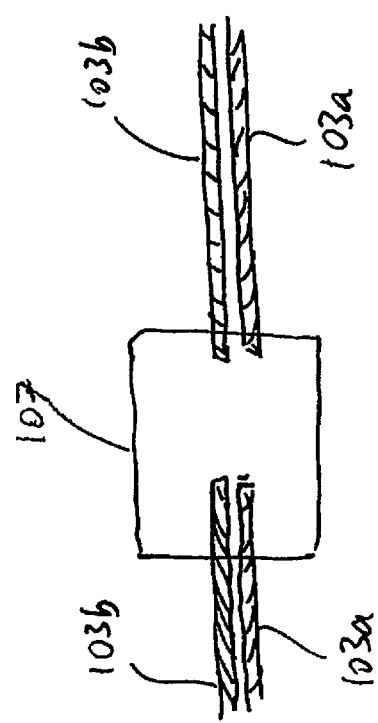
FIG. 11 is a schematic illustration of another embodiment of a segment divider of the valve of FIG. 1, effecting division of two separate trigger segments.

In some embodiments, for example, and such as the embodiment illustrated in FIG. 11, each one of the components 103a, 103b of any segment 103 are separate pieces relative to corresponding components 103a, 103b of every one of the other segments 103, and the segment dividers 107 function as anchors.

In some embodiments, for example, for each one of the temperature responsive trigger segments 103, independently, each one of the components 103a, 103b is elongated. In some of these embodiments, for example, each one of the components 103a, 103b is in the form of a respective wire.

In some embodiments, for example, prior to responding to receiving of heat energy for effecting the exertion of a tensile force for effecting the displacement of the displaceable interference-effecting trigger portion, the temperature responsive trigger segment 103 is disposed in an unactuated condition, and, in the unactuated condition, the components 103a, 103b of the temperature responsive trigger segment 103 are disposed in a parallel, or substantially parallel, relationship relative to one another.

In some embodiments, for example, the shape changing material-comprising component 103a includes a shape memory alloy. In some of these embodiments, for example, the shape memory alloy is configured to contract at least 5% in response to heating the shape memory alloy from a temperature of 20 degrees Celsius to a temperature of 98 degrees Celsius. In some of these embodiments, for example, the shape memory alloy is a nickel-titanium shape memory alloy. In some embodiments, for example, the shape changing material-comprising component is a nickel-titanium shape memory alloy wire.

In some embodiments, for example, the relatively inelastic material-comprising component 103b includes steel. In some embodiments, for example, the relatively inelastic material-comprising component is a steel wire.

Second Aspect

In another aspect, the temperature responsive trigger portion 100 includes a plurality of constituent trigger segments 1011 connected to one another, in series. The constituent trigger segments 1011 include: (a) a shape changing temperature responsive trigger segment 1031a configured for assuming a change in shape in response to receiving of heat energy, and (b) one or more relatively inelastic trigger segments 1031b.

In one sub-aspect, each one of the one or more relatively inelastic trigger segments 1031b has a modulus of elasticity that is greater than the modulus of elasticity of the shape changing temperature responsive trigger segment. In some embodiments, for example, each one of the one or more relatively inelastic trigger segments 1031b has a modulus of elasticity that is greater than the modulus of elasticity of the shape changing temperature responsive trigger segment 1031a by a factor of at least of at least two (2), such as, for example, at least five (5), or such as, for example, at least ten (10).

In another sub-aspect, each one of the relatively inelastic material-comprising segments 1031b has a stiffness that is greater than the stiffness of the shape changing temperature responsive trigger segment 1031a. In some embodiments, for example, each one of the relatively inelastic material-comprising segments 1031b has a stiffness that is greater than the stiffness of the shape changing temperature responsive trigger segment 1031a. by a factor of at least two (2), such as, for example, at least five (5), or such as, for example, at least ten (10).

In some embodiments, for example, each one of the relatively inelastic material-comprising segments 1031b has a minimum diameter of at least 0.010 inches. In some embodiments, for example, each one of the relatively inelastic material-comprising segments 1031b has a minimum diameter of at least 0.015 inches. In some embodiments, for example, each one of the relatively inelastic material-comprising segments 1031b has a minimum diameter of 0.020 inches.

In some embodiments, for example, each one of the one or more relatively inelastic trigger segments 1031b is deformable only above the temperature at which the shape changing temperature responsive trigger segment is predisposed for assuming a change in shape.

In some embodiments, for example, the shape changing temperature responsive trigger segment 1031a is configured for exerting a tensile force, in response to receiving of heat energy, to effect the displacement of the displaceable interference-effecting trigger portion 131.

In some embodiments, for example, each one of the relatively inelastic trigger segments 1031b, independently, is sufficiently inelastic such that tensile force, being exerted by the shape changing temperature responsive trigger segment 1031a in response to receiving of heat energy by the shape changing temperature responsive trigger segment 1031a, is not absorbed, by the one or more relatively inelastic trigger segments 1031b, to a sufficient extent to prevent transmission of a sufficient fraction of the tensile force to the displaceable interference-effecting trigger portion 131 for effecting displacement of the displaceable interference-effecting trigger portion 131. This has the effect that the displacement of the displaceable interference-effecting trigger portion 131 is effected in response to the receiving of applied heat energy by the shape changing temperature responsive trigger segment 1031a. Absorption of the exerted tensile force, by the other ones of the relatively inelastic trigger segments 1031b, could have the effect that the exerted tensile force is not transmitted to the displaceable interference-effecting trigger portion 131, and does not effect displacement of the displaceable interference-effecting trigger portion 131 from the first trigger position to the second trigger position.

In some embodiments, for example, the exertion of a tensile force by the shape changing temperature responsive trigger segment 1031a is effected in response to a changing in shape of the shape changing temperature responsive trigger segment 1031a in response to receiving of heat energy by the shape changing temperature responsive trigger segment 1031a. In some of these embodiments, for example, the effected change in shape, of the shape changing temperature responsive trigger segment 1031a, includes a contraction of the shape changing temperature responsive trigger segment 1031a. In other ones of these embodiments, for example, the effected change in shape, of the shape changing temperature responsive trigger segment 1031a, includes a reduction in length of the shape changing temperature responsive trigger segment 1031a, along its longitudinal axis.

In some embodiments, for example, each one of the constituent trigger segments 1011 is elongated. In some of these embodiments, for example, each one of the segments 1011 is in the form of a respective wire.

In some embodiments, for example, the shape changing temperature responsive segment 1031a includes a shape memory alloy. In some of these embodiments, for example, the shape memory alloy is configured to contract at least 5% in response to heating the shape memory alloy from a temperature of 20 degrees Celsius to a temperature of 98 degrees Celsius. In some of these embodiments, for example, the shape memory alloy is a nickel-titanium shape memory alloy. In some embodiments, for example, the shape changing temperature responsive segment is a nickel-titanium shape memory alloy wire.

In some embodiments, for example, the relatively inelastic trigger segment 1031b includes steel. In some embodiments, for example, the a relatively inelastic material-comprising segment is a steel wire.

In some embodiments, for example, the constituent trigger segments 1011 are connected to one another with segment dividers 107.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A valve comprising,
a body;
a passageway defined within the body, wherein the passageway includes an inlet and an outlet;
a sealing member configured for displacement between a closed position and an open position, wherein in the closed position, the sealing member prevents fluid communication between the inlet and outlet of the passageway, and in the open position, the inlet and the outlet of the passageway are disposed in fluid communication; and
a trigger, including a displaceable interference-effecting trigger portion configured for displacement between a first trigger position and a second trigger position, wherein the displaceable interference-effecting trigger portion cooperates with the sealing member such that, while the displaceable interference-effecting trigger portion is disposed in the first trigger position, the displaceable interference-effecting trigger portion effects interference with displacement of the sealing member from one of the open position and the closed position to the other one of the open position and the closed position, and when the displaceable interference-effecting trigger portion is disposed in the second trigger position, the interference effected by the displaceable interference-effecting portion, is removed;
wherein, while the displaceable interference-effecting portion is disposed in the second trigger position, the sealing member is displaceable from the closed position to the open position in response to a pressure differential, existing between the inlet and the outlet, which is greater than a minimum predetermined threshold pressure differential;
and wherein the trigger further includes a temperature responsive trigger portion including a plurality of constituent trigger segments connected to one another, in series, the constituent trigger segments including: (a) a shape changing temperature responsive trigger segment configured for assuming a change in shape in response to receiving of heat energy, and (b) one or more relatively inelastic trigger segments, each one of the one or more relatively inelastic trigger segments having a modulus of elasticity that is greater than the modulus of elasticity of the shape changing temperature responsive trigger segment.

2. The valve as claimed in claim 1;
wherein each one of the one or more relatively inelastic trigger segments has a modulus of elasticity that is greater than the modulus of elasticity of the shape changing temperature responsive trigger segment by a factor of at least two (2).

3. The valve as claimed in claim 1;
wherein each one of the relatively inelastic material-comprising segments has a stiffness that is greater than the stiffness of the shape changing temperature responsive trigger segment.

4. The valve as claimed in claim 1;
wherein each one of the relatively inelastic material-comprising segments has a stiffness that is greater than the stiffness of the shape changing temperature responsive trigger segment by a factor of at least two (2).

5. The valve as claimed in claim 1;
wherein the shape changing temperature responsive trigger segment is configured for exerting a tensile force, in response to receiving of heat energy, to effect the displacement of the displaceable interference-effecting trigger portion.

6. The valve as claimed in claim 5;
wherein each one of the relatively inelastic trigger segments, independently, is sufficiently inelastic such that tensile force, being exerted by the shape changing temperature responsive trigger segment in response to receiving of heat energy by the shape changing temperature responsive trigger segment, is not absorbed, by the one or more relatively inelastic trigger segments, to a sufficient extent to prevent transmission of a sufficient fraction of the tensile force to the displaceable interference-effecting trigger portion for effecting displacement of the displaceable interference-effecting trigger portion, such that the displacement of the displaceable interference-effecting trigger portion is effected in response to the receiving of applied heat energy by the shape changing temperature responsive trigger segment.

7. The valve as claimed in claim 5;
wherein the exertion of a tensile force by the shape changing temperature responsive trigger segment is effected in response to a changing in shape of the shape changing temperature responsive trigger segment in response to receiving of heat energy by the shape changing temperature responsive trigger segment.

8. The valve as claimed in claim 7;
wherein the effected change in shape, of the shape changing temperature responsive trigger segment, includes a contraction of the shape changing temperature responsive trigger segment.

9. The valve as claimed in claim 7;
wherein the effected change in shape, of the shape changing temperature responsive trigger segment, includes a reduction in length of the shape changing temperature responsive trigger segment, along its longitudinal axis.

10. The valve as claimed in claim 1;
wherein a shape changing temperature responsive trigger segment includes a shape memory alloy.

11. The valve as claimed in claim 10;
wherein the shape memory alloy is configured to contract at least 5% in response to heating the shape memory alloy from a temperature of 20 degrees Celsius to a temperature of 98 degrees Celsius.

12. The valve as claimed in claim 10;
wherein the shape memory alloy is a nickel-titanium shape memory alloy.

13. The valve as claimed in claim 1;
wherein, for each one of the constituent trigger segments, independently, each one of the segments is elongated (wire).

14. The valve as claimed in claim 1;
wherein the constituent trigger segments are connected to one another with segment dividers.

15. The valve as claimed in claim 1;
further comprising a trigger retainer connected to a retained trigger portion of the trigger, for resisting displacement of the retained trigger portion.

\* \* \* \* \*